United States Patent [19]

Baxter et al.

[11] Patent Number: 4,797,666

[45] Date of Patent: Jan. 10, 1989

[54] METHOD AND APPARATUS FOR MONITORING FLUID FLOW

[76] Inventors: Carlton J. Baxter, 74 Sawmill Rd., Penfield, N.Y. 14526; David C. Baxter, 93 Carlisle St., Rochester, N.Y. 14615

[21] Appl. No.: 908,015

[22] Filed: Sep. 16, 1986

[51] Int. Cl.⁴ .............................................. G08B 21/00
[52] U.S. Cl. .................................................. 340/606
[58] Field of Search ............... 340/603, 605, 606, 609, 340/616, 527, 529; 137/460, 459, 487.5, 552.7, 624.11, 624.13

[56] References Cited

U.S. PATENT DOCUMENTS

| | | | |
|---|---|---|---|
| 3,858,436 | 1/1975 | Hines | 73/40 |
| 3,976,989 | 8/1976 | Smith | 137/552.7 |
| 4,106,331 | 8/1978 | Burton | 73/61.3 |
| 4,481,503 | 11/1984 | Lehman | 340/606 |
| 4,509,601 | 4/1985 | Spector | 340/527 |
| 4,518,955 | 5/1985 | Meyer | 340/605 |

Primary Examiner—Joseph A. Orsino
Assistant Examiner—Jill D. Jackson
Attorney, Agent, or Firm—Lawrence P. Kessler

[57] ABSTRACT

In a fluid flow supply system, monitoring a fluid supply system to accurately determine whether an abnormal flow condition or a catastrophic flow condition exists in such supply system. A parameter of fluid flow in the supply system is measured and a first signal is produced corresponding to such parameter. A first timer, adapted to be reset by the first signal, produces a signal upon expiration of a preselected time period. A second timer, adapted to be reset by the signal produced by the first timer, produces an output signal upon expiration of a preselected time period substantially greater in duration than the preselected time period of the first timer. Accordingly if the time period of the first timer is not exceeded (i.e., it is continuously reset by first signals measuring the fluid flow parameter), then the time period for the second timer will be exceeded whereby an abnormal flow condition is determined to exist. Additionally, an accumulated running total of the first signal is compared to a second signal representative of a preselected fluid flow parameter, and an output signal is produced when the first signal exceeds the second signal, whereby a catastrophic flow condition is determined to exist. A control signal for the supply system is produced in response to the production of an output signal from the second timer or the comparator. The control signal can be used to restrict the fluid supply system and/or provide a perceivable indication that an abnormal or catastrophic flow condition exists.

12 Claims, 1 Drawing Sheet

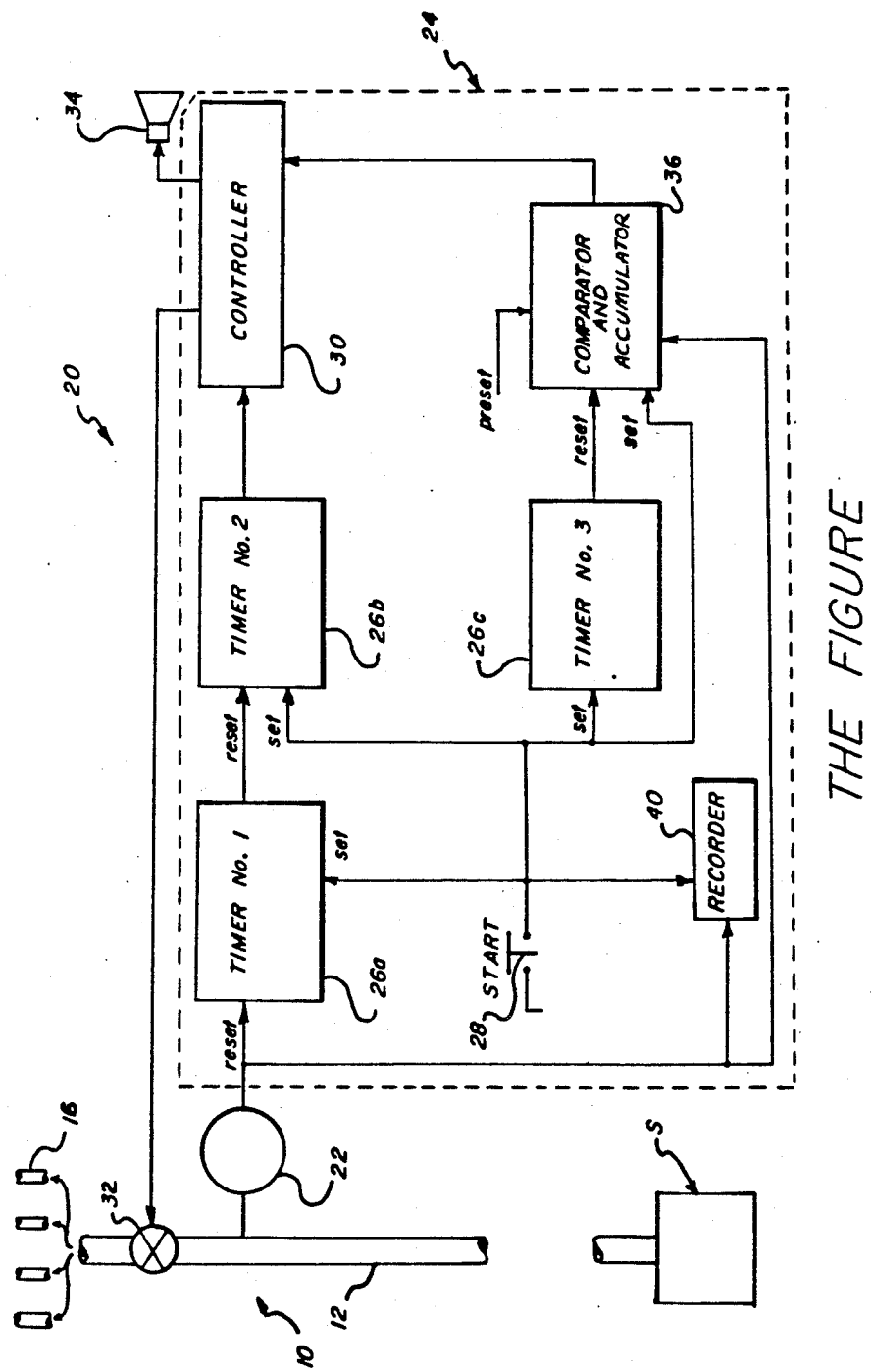
THE FIGURE

METHOD AND APPARATUS FOR MONITORING FLUID FLOW

BACKGROUND OF THE INVENTION

This invention relates in general to monitoring fluid flow in a flow conduit system, and more particularly to detecting abnormal flow conditions such as leaks or catastrophic conditions such as plumbing failures in a fluid supply system.

Common flow conduit systems in wide use today include, for example, water supply systems for dwellings or other type buildings. With the important emphasis on conservation which exists today, it is essential to protect against water waste due to conditions such as leaks or plumbing failures in a water supply system. Such conditions not only result in wasting of a valuable natural resource but can cause serious damage to the structure being serviced by the water supply system and its surrounding environment. Since water supply systems are typically at least partially inaccessible (e.g., located behind structural walls or underground), it has been difficult to determine that a plumbing failure has occurred until significant damage has already been done. Moreover, relatively small leaks can go undetected for long periods of time since no significant damage may readily manifest itself. Such leaks result in considerable water wastage and may cause considerable expense to be incurred by the property owner for the increased water usage.

Numerous attempts have been made to devise mechanisms which detect leakage in a water supply system (see for example, U.S. Pat. No. 4,518,955, issued May 21, 1985 in the name of Meyer). The apparatus of this patent utilizes a fluid-flow pressure sensing device which detects a "no flow", "moderate flow", or "large flow" condition, and through a microcomputer activates a control device to operate an alarm and/or shut down the supply if the flow is determined to be a leak or plumbing failure. This particular sensing device is dependent upon unique pressure conditions associated with a specific water supply system. That is to say, without significant modifications to the device, if the pressure conditions change under normal operation (such as adding another take-off line for example), the device is no longer capable of giving a valid reading. Moreover, leak detection is based upon sensing flow above a certain preselected flow level. Such a method of predicting that a leak has occurred is severely limited and highly inaccurate due to the wide range of water usage to which any particular supply system is subjected. Specifically, the preselected flow level has to be high enough to accommodate a maximum permissible usage, and being at such a level may not be cabable of detecting a leak which is at a lesser flow level.

SUMMARY OF THE INVENTION

This invention is directed to monitoring a fluid supply system to accurately determine whether an abnormal flow condition or a catastrophic flow condition exists in such supply system. A parameter of fluid flow in the supply system, such as flow volume for example, is measured and a first signal is produced corresponding to such parameter. A first timer, adapted to be reset by the first signal, produces a signal upon expiration of a preselected time period. A second timer, adapted to be reset by the signal produced by the first timer, produces an output signal upon expiration of a preselected time period substantially greater in duration than the preselected time period of the first timer. Accordingly if the time period of the first timer is not exceeded (i.e., it is continuously reset by first signals measuring the fluid flow parameter), then the time period for the second timer will be exceeded whereby an abnormal flow condition is determined to exist. Additionally, an accumulated running total of the first signal is compared to a second signal representative of a preselected fluid flow parameter, and an output signal is produced when the first signal exceeds the second signal, whereby a catastrophic flow condition is determined to exist. A control signal for the supply system is produced in response to the production of an output signal from the second timer or the comparator. The control signal can be used to shut off, or restrict, the fluid supply system and/or provide a perceivable indication that an abnormal or catastrophic flow condition exists.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which:

The FIGURE is a schematic block diagram of the fluid flow monitor according to this invention.

DESCRIPTION OF THE PREFERRED EMBODIMENT

Referring now to the accompanying drawing, an exemplary fluid supply system, designated by the numeral 10, includes a main control 12 connecting a fluid source S to a plurality of end use devices through branch conduits 16. For example, the fluid supply system 10 may be a water supply connected between a trunk supply conduit and a plurality of individual units in a residential dwelling. The fluid supply system 10 is monitored by the monitor device, according to this invention, designated generally by the numeral 20. Of course, the monitor device 20 according to this invention is suitable for use with other water supply systems, such as systems serving single unit residential dwellings, commercial or industrial buildings; and is capable of monitoring other types of fluids, such as liquid and gaseous fluids used in industrial plants.

The monitor device 20 includes a mechanism 22 for measuring a particular parameter associated with fluid flow in the fluid supply system 10. Although other parameters such as fluid pressure can be measured, it is preferred for use with this invention that the rate of fluid flowing in the conduit 12 be measured. The mechanism 22 is therefore any well known water flow meter with the capability of producing a signal corresponding to the measured flow volume. For example, the mechanism may include an internal magnet which rotates at a speed in proportional response to fluid flow. Then, an external Hall effect sensor can detect the rotation of the magnet and produce digital electrical pulses directly related to the fluid flow through the mechanism with a given number of pulses being equal to a particular flow volume. Such digital electrical pulses, or a preselected number of such pulses, are utilized as an input signal which is delivered to a signal processing unit, designated generally by the numeral 24 and depicted in the drawing as being within the dotted lines.

The signal processing unit 24 enables the monitor device 20 to be capable of determining the occurrence of abnormal flow conditions and catastrophic flow conditions in the fluid supply system 10, as well as recording the history of flow in the conduit 12 of the supply system 10. The principle underlying the selected operation of the signal processing unit 24 according to this invention is that all fluid supply systems, capable of utilizing the monitor device 20, have determinable time periods during which fluid flow should be at a minimum, and a maximum fluid flow which should not be exceeded during a different determinable time period. If there is fluid flow above the minimum during the period when the flow should be below the minimum, an abnormal flow condition is determined to exist; and if there is fluid flow above the maximum during the different determinable time period, than a catastrophic flow condition is determined to exist.

In a specific application of the above described principle to a water supply system for a residential dwelling for example, it has been determined that during a given period of time the water flow should be substantially zero for at least a given portion of that time period. For example, during a four hour time period, water flow should be below one gallon during at least one fifteen minute period. If the water flow is not below one gallon during at least one fifteen minute time period out of a four hour time period, then it is determined that an abnormal flow condition exists in the supply system. Such abnormal condition can reasonably be assumed to be a leak, such as in a faucet or toilet for example. Moreover, if the fluid flow during a three hour time period is greater than two hundred gallons, it is determined that a catastrophic flow condition exists in the supply system. Such catastrophic flow condition can reasonably be assumed to be a plumbing failure, such as a pipe rupture for example. Of course the particular time periods selected and the specific flows chosen are dependent upon the particular fluid supply system with which the monitor device 20 is associated and the type of building being supplied by the fluid supply system.

In order to carry out the described principle, the signal processing unit 24 includes a plurality of timers 26a, 26b, and 26c. The first timer 26a has a relatively short duration time period, such as fifteen minutes for the above exemplary supply system. The timer 26a is initially set by a signal produced when a start button 28 is depressed, and is adapted to be operatively responsive to a signal from the measuring mechanism 22 to reset the such timer. As noted above, the measuring mechanism 22 produces electrical pulses in proportion to fluid flow. Of course, no flow (or a flow amount less than an amount necessary to produce a pulse) results in the mechanism 22 producing no signal. If mechanism 22 does not produce a signal the timer is not reset by a signal from the mechanism 22 and is allowed to complete its time cycle to produce an output signal. This indicates that there has been less than a preselected flow in the supply system (one gallon in the above exemplary supply system). The second timer 26b has a substantially longer time duration period, such as four hours for the above exemplary supply system. The timer 26b, which is also initially set by the signal produced on depressing the start button 28, is adapted to be operatively responsive to the output signal from the timer 26a to reset such timer 26b. If the timer 26b is not reset by a signal from the timer 26a and is allowed to complete its time cycle, that means that the timer 26a has not been allowed to complete any of its shorter duration time cycles. That is to say, fluid flow in the supply system has, during the time duration period of timer 26b, continuously been above the minimum flow for all the time duration periods of timer 26a. Accordingly, an abnormal flow condition is determined to exist in the fluid supply system 10. The timer 26b then produces an output signal which is sent to a controller device 30.

The controller device 30 is operatively coupled to a mechanism 32, such as any well known flow restrictor valve assembly for example, which selectively restricts or shuts off the fluid flow. Accordingly, when the controller device 30 receives an output signal from the timer 26b, indicating that an abnormal flow condition exists in the supply system 10, the device actuates the mechanism 32 to restrict or interrupt fluid flow in the supply system. This will prevent undue fluid waste and damage to the associated dwelling structure due to the abnormal flow condition. Additionally, the controller device 30 is operatively coupled to an alarm mechanism 34. The alarm mechanism 34, which is actuated by the controller device 30 when the controller device receives an output signal from the timer 26b, emits a perceivable indication that an abnormal flow condition has been determined to exist. Such perceivable indication may be an audible signal or a visible signal (or both). Alternatively the alarm mechanism 34 may utilize radio or telephonic signals for providing the perceivable indication of the abnormal flow condition. Of course, the controller device 30 can be arranged to individually actuate one or the other of the mechanisms 32 and 34, as well as provide for simultaneous actuation thereof.

In order to make a determination of the existance of a catastrophic flow condition in the supply system 10, the timer 26c is operatively connected to a comparator and accumulator means 36. The comparator 36 receives the digital electrical pulse signals from the measuring mechanism 22, and accumulates a running total of such pulse signals corresponding to the fluid flow in the system for the determined time such flow (sum of the pulse signals) is totalized. The accumulated running total of fluid flow is compared to a preselected input signal to the comparator corresponding to a maximum allowable flow for a preselected time period, such as two hundred gallons in a three hour time period in the above exemplary supply system. The timer 26c, which is also initially set by the signal produced on depressing the start button 28, on completing its time duration period, produces an output signal which resets the accumulated running total in the comparator and accumulator means. If, however, in the comparator and accumulator means 36 the accumulated running total of the signals from the measuring mechanism 22 exceeds the preselected input signal before receiving the output signal from the timer 26c, it is determined that a catastrophic flow condition exists in the supply system. The comparator and accumulator means then produces an output signal which is sent to the controller device 30. The controller device responds to such output signal in the same manner as described above with reference to the output signal from timer 26b, to interrupt flow in the supply system and/or provide the perceivable indication of such catastrophic flow condition therein.

It should also be noted that the measuring mechanism 22 can be operatively coupled to a recording device 40 of any well known type. The recording device will provide a time based history of flow in the supply system. Such history can be used to optimally adjust the time duration periods of the timers 26a, 26b, 26c and/or the preselected minimum and maximum flows utilized in the signal processing unit 24.

The invention has been described in detail with particular reference to a preferred embodiment thereof, but it will be understood that variations and modifications can be effected within the spirit and scope of the invention.

We claim:

1. In a fluid supply system, apparatus for monitoring fluid flow to determine whether either an abnormal flow condition or a catastrophic flow condition exists in such supply system, said apparatus comprising:

means for measuring a parameter of fluid flow in said supply system, and producing a first signal corresponding to such parameter;

first timer means, responsive to said first signal to be reset thereby, for producing a signal upon expiration of a preselected time period;

second timer means, responsive to said signal produced by said first timer means to be reset thereby, for producing an output signal upon expiration of a preselected time period substantially greater in duration than the preselected time period of said first timer means, whereby upon production of such output signal an abnormal flow condition is determined to exist;

means, responsive to said first signal for comparing an accumulated running total of said first signal to a second signal representative of a preselected fluid flow parameter, and producing an output signal when said accumulated running total of said first signal exceeds said second signal, whereby upon production of such output signal a catastrophic flow condition is determined to exist; and means responsive to said output signal of said second timer means or of said comparing means, for producing a control signal for said supply system.

2. The invention of claim 1 wherein said parameter measured by said measuring means is fluid flow volume.

3. The invention of claim 2 wherein said second signal representative of a preselected flow parameter utilized by said comparing means is representative of a maximum fluid flow in said supply system.

4. The invention of claim 1 further including means, operatively associated with said supply system and responsive to said control signal, for restricting or interrupting fluid flow in said supply system.

5. The invention of claim 1 further including alarm means, responsive to said control signal, for producing a perceivable indication of an abnormal or catastrophic flow condition in said supply system.

6. The invention of claim 1 further including means, operatively associated with said supply system and responsive to said control signal, for restricting or interrupting fluid flow in said supply system and alarm means, responsive to said control signal, for producing a perceivable indication of an abnormal or catastrophic flow condition in said supply system.

7. The invention of claim 1 further including means for recording said flow parameter measured by said measuring means.

8. In a fluid supply system, a method of monitoring fluid flow so as to produce a control signal upon determining that either an abnormal flow condition or a catastrophic flow condition exist in such supply system, said method comprising the steps of:

(1) continuously sampling the flow of fluid in said supply system and measuring the flow volume;

(2) during a preselected time period, determining if the flow is less than a minimum preselected flow during a preselected shorter time period;

(3) producing a control signal indicative of an abnormal flow condition if the flow determined in step (2) is not less than the minimum preselected flow volume during such preselected shorter time period;

(4) comparing an accumulated running total of the flow in a third preselected time period with a predetermined maximum flow for such period; and (5) producing a control signal indicative of a catastrophic flow condition if such accumulated running total flow exceeds such predetermined maximum flow.

9. The method of claim 8 further including the step of recording the totalized flow volume.

10. The method of claim 8 further including the step of applying the produced control signal to a mechanism for restricting or interrupting fluid flow in said supply system.

11. The method of claim 8 further including the step of applying the produced control signal to an alarm device to provide a perceivable indication of an abnormal or catastrophic flow condition in said supply system.

12. The method of claim 8 further including the steps of applying the produced control signal to a mechanism for restricting or interrupting fluid flow in said supply system, and applying the produced control signal to an alarm device to provide a perceivable indication of an abnormal or catasrophic flow condition in said supply system.

* * * * *